(12) United States Patent
Schwab et al.

(10) Patent No.: US 9,469,167 B2
(45) Date of Patent: Oct. 18, 2016

(54) VEHICLE PNEUMATIC TIRE HAVING A SEALING MATERIAL ON THE INSIDE OF THE TIRE

(71) Applicant: Bayerische Motoren Werke Aktiengesellschaft, Munich (DE)

(72) Inventors: Axel Schwab, Munich (DE); Martin Pehlke, Olching (DE); Armin Gumpp, Gersthofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 485 days.

(21) Appl. No.: 13/960,050

(22) Filed: Aug. 6, 2013

(65) Prior Publication Data

US 2013/0319085 A1  Dec. 5, 2013

Related U.S. Application Data

(63) Continuation of application No. PCT/EP2011/071558, filed on Dec. 1, 2011.

(30) Foreign Application Priority Data

Feb. 7, 2011 (DE) .................. 10 2011 003 712

(51) Int. Cl.
*B60C 23/04* (2006.01)
*B60C 19/12* (2006.01)

(52) U.S. Cl.
CPC ............. *B60C 23/04* (2013.01); *B60C 19/122* (2013.04); *B60C 23/0493* (2013.01)

(58) Field of Classification Search
CPC .. B60C 19/122; B60C 23/0493; B60C 23/04
USPC ...... 73/49, 40, 146.2, 146, 45.6, 146.8, 49.8
See application file for complete search history.

(56) References Cited

U.S. PATENT DOCUMENTS

| 6,885,291 B1* | 4/2005 | Pollack ............... B60C 23/0493 116/34 R |
| 2005/0126704 A1* | 6/2005 | Wacker ............... B60C 23/0408 156/307.7 |

(Continued)

FOREIGN PATENT DOCUMENTS

| DE | 10 2004 020 076 A1 | 11/2005 |
| DE | 10 2007 008 043 A1 | 8/2008 |

(Continued)

OTHER PUBLICATIONS

German Search Report dated Jun. 7, 2011 w/ partial English translation (ten (10) pages).
International Search Report dated Dec. 30, 2011 with English translation (four (4) pages).

*Primary Examiner* — Hezron E Williams
*Assistant Examiner* — Marrit Eyassu
(74) *Attorney, Agent, or Firm* — Crowell & Moring LLP

(57) ABSTRACT

A vehicle pneumatic tire has a sealing material on the inside of the tire, which material approximately closes off a leak resulting from damage to the tire. A warning system is provided in a section of the tire having the sealing material. The warning system may be a sensor unit, which monitors the tire air pressure and is secured via an adhesive film to the inside of the tire having the sealing material. The adhesive film is adhered over a large surface area which is larger by an order of magnitude than a base surface of the sensor unit or of a sensor unit securing device. The adhesive film may cover the sensor unit so that it is located between the adhesive film and the inside of the tire.

19 Claims, 3 Drawing Sheets

(56) References Cited

U.S. PATENT DOCUMENTS

| | | | |
|---|---|---|---|
| 2005/0262934 A1* | 12/2005 | Naidu | B60C 23/0408 73/146 |
| 2008/0035259 A1* | 2/2008 | Mancosu | B29D 30/0662 152/246 |
| 2010/0043541 A1* | 2/2010 | Kobayakawa | B60C 23/0411 73/146 |
| 2010/0291345 A1* | 11/2010 | Cubizolle | B60C 23/0493 428/138 |
| 2011/0146860 A1* | 6/2011 | Majumdar | B29C 73/163 152/209.1 |
| 2011/0240195 A1 | 10/2011 | Ellmann | |

FOREIGN PATENT DOCUMENTS

| | | | |
|---|---|---|---|
| DE | 10 2007 030 238 A1 | 1/2009 | |
| DE | 10 2007 060 861 A1 | 6/2009 | |
| DE | 10 2008 053 506 A1 | 4/2010 | |
| DE | 102008053506 A1 * | 4/2010 | B60C 19/122 |
| DE | 10 2009 006 707 A1 | 8/2010 | |
| EP | 1 598 220 A2 | 11/2005 | |
| WO | WO 99/29522 A1 | 6/1999 | |
| WO | WO 2005/002887 A2 | 1/2005 | |

* cited by examiner

VEHICLE PNEUMATIC TIRE HAVING A SEALING MATERIAL ON THE INSIDE OF THE TIRE

CROSS REFERENCE TO RELATED APPLICATIONS

This application is a continuation of PCT International Application No. PCT/EP2011/071558, filed Dec. 1, 2011, which claims priority under 35 U.S.C. §119 from German Patent Application No. DE 10 2011 003 712.8, filed Feb. 7, 2011, the entire disclosures of which are herein expressly incorporated by reference.

BACKGROUND AND SUMMARY OF THE INVENTION

The invention relates to a vehicle pneumatic tire having a sealing material on the interior side of the tire which, when the tire is damaged, at least approximately closes off a resulting leak, as well as to a warning system. With respect to the state of the art, reference is made, in addition to German published patent applications DE 10 2007 030 238 A1, DE 10 2007 008 043 A1 and DE 10 2009 006 707 A1, also to German patent document DE 10 2008 053 506 A1.

In the document mentioned second above, so-called electronic modules are known which have transponders and sensors by which, as a matter of priority, the pneumatic pressure in the tire is measured and is transmitted to a monitoring unit provided in the vehicle. Such tire modules, which in the present case, are called sensor units, are known to a person skilled in the art. Sensor units integrated in the wall of the tire are basically known; furthermore sensor units are known onto which a so-called foot made of a rubber material is formed, which is glued to the wall of the tire (German patent document DE 10 2007 030 238 A1), as well as sensor units which are inserted into a suitable holding device which is vulcanized or glued to the interior side of the tire, particularly to the interior side of its running surface (German patent document DE 10 2009 006 707 A1).

In the initially last-mentioned document, a so-called self-sealing tire is described which has a warning system. Self-sealing tires are distinguished by a sealing material applied at least to the interior side of the tire running surface, which sealing material, for example, in the event of a puncturing of the running surface caused by a nail or the like situated in an unfavorable position on the road, essentially tightly closes off the resulting hole. The tire according to this German patent document DE 10 2008 053 506 A1 also has a warning system which, when the tire is damaged, triggers a warning and which is formed by a network of electric lines which cover the sealing material.

Instead of such a high-expenditure warning system, a basically known tire pressure sensor unit could be arranged in a tire having a sealing material on the interior side of the tire, which sealing material, when the tire is damaged, at least approximately closes off a resulting leak. However, it was found that the gluing of such a compact sensor unit or its holding device onto the interior tire wall or interior side of the running surface, which has been common as a preferred joining technique, is not possible because simply no adhesive could be found that ensures a sufficient adhesion to such a sealing material.

It is to be indicated in the following how, nevertheless, a customary sensor unit for monitoring the pneumatic tire pressure at a pneumatic vehicle tire can be mounted on the interior side of the tire by means of a sealing material.

The achieving of this object is characterized in that the warning system constructed as a sensor unit known per se for monitoring the pneumatic pressure in the tire is fixed by way of an adhesive film to the interior side of the tire provided with the sealing material. The adhesive film is glued over a large surface onto the interior side of the tire. The surface of the adhesive film is several times larger than the base surface of the sensor unit or of a holding device for the sensor unit.

It was found that a significant enlargement of the surface of the sealing material included in an adhesive connection already represents a sufficient measure in order to be able to fasten a sensor unit for monitoring the pneumatic pressure in the tire securely by way of adhesion on an interior side of the tire or interior wall equipped or coated with this sealing material. This surface enlargement is achieved without any significant disadvantage with regard to the weight and, particularly, the imbalance by means of a so-called adhesive film, by which the tire pressure sensor unit can be fixed directly, or by way of a holding device indirectly, on the interior side of the tire. In this case, the adhesive film may cover the sensor unit, so that the sensor unit is situated between the adhesive film and the interior side of the tire, in which case, adhesive may additionally be provided between the sensor unit and the interior wall of the tire. In order to make it possible to then further faultlessly measure the pneumatic tire pressure when an essentially airtight adhesive film is used, it may be necessary to provide at least one hole or one duct at a suitable location in the adhesive film for a pressure compensation between the sensor unit and the tire interior. However, it is also contemplated to fasten, for example by gluing, the sensor unit to the side of the adhesive film that faces away of the interior wall of the tire, and/or, on the side of the adhesive film facing away from the interior wall of the tire, provide a holding device adapted to the sensor unit. In this case, the holding device may be formed into the adhesive film and is thereby quasi-formed by the adhesive film itself, or such a holding device assigned to the sensor unit may be connected with the adhesive film by means of gluing.

As mentioned above, by use of an adhesive film according to the invention, the surface of the sealing material included in the adhesive connection can be considerably enlarged; in other words, the surface of the adhesive film is several times larger, preferably larger by an order of magnitude of at least 10 to 20, than the base surface of the above-mentioned sensor unit facing the interior side of the tire or of the holding device for the sensor unit. For defining this ratio of sizes, the holding device is only a component provided for this holding function or, if the holding device is formed into the adhesive film, only the section of the adhesive film carrying out this holding function. The term "base surface" applies to that surface by which the sensor unit or the holding device of the state of the art would be glued to the interior side of the tire without an adhesive film according to the invention.

In a preferred embodiment, the length of the adhesive film measured in the circumferential direction of the vehicle tire is greater than the width of this vehicle tire, in which case, the adhesive film may naturally also still be greater than indicated by the figures. In an extreme case, the adhesive film may extend over the entire circumference of the interior side of the tire, particularly over the interior side of the running or tread surface of the tire. Particularly in the last-mentioned case, it is advantageous for the adhesive film to have an essentially diffusion-tight barrier layer, which prevents a creeping pressure loss in the tire, as known, for example, from German patent document 10 2004 020 076 A1.

In accordance with advantageous further developments of the present invention, the here so-called adhesive film can take over at least one additional function, besides the fixing of the tire pressure sensor unit on the interior side of the tire equipped with the sealing material. Thus, in addition to this sensor unit, an additional unit preferably used for the monitoring of the tire, or a unit obtaining electric energy or data from the movement of the tire may be provided on the adhesive film or be held on the interior side of the tire by the adhesive film. As examples of units used for the monitoring of the tire, moisture sensors, temperature sensors or a puncture sensor can be mentioned, in which case, a puncturing of the tire can also be determined, for example, by means of a moisture sensor. Piezo elements, for example, can be used as structures for generating energy, which piezo elements generate electric energy from deformations or vibrations; or other elements can be used which utilize thermal differences. Such elements may also be provided in the form of a layer on an adhesive film. Strain gauges can be used for the obtaining of data, for example, by way of the vertical tire forces. Finally, an antenna for the telemetric signal transmission to an electronic monitoring unit provided in the vehicle body may also be integrated in the adhesive film, or the adhesive film may carry such an antenna. In particular, if, as mentioned above, several electric elements are provided in the tire or on the adhesive film, which are electrically connected with one another, such an electric connection may be provided, for example, between the sensor unit or an electric terminal area provided for the latter and a further unit or a further element. In this case, the adhesive film may, for example, consist of a flexible strip conductor film, such as a copper-coated polyimide film, coated with an adhesive for the connection with the sealing material.

The currently used tire pressure sensor units are integrated in rigid housings or are cast into a hard casting compound, which, under extreme marginal conditions, may, however, have the result that the interior tire surface may be damaged in the event of a heavy load on the tire, or that, when driving over an obstacle, the components are damaged that are provided in the sensor unit. Such an effect can be avoided when the sensor unit is quasi-floatingly disposed in a gel-type mass, which is basically known; compare, for example, International patent document WO2005/002887 A2.

In the present case, the adhesive film according to the invention may now be constructed for accommodating such a gel-type mass. The adhesive film or a further film-type structure fixed thereto therefore forms a receptacle for this electrically non-conductive gel, in which the electric-electronic components of the sensor unit are disposed, in which case, as a function of properties of the gel and/or of the further development of the pressure sensor of the sensor unit, a connection between the pressure sensor of the sensor unit and the interior of the tire may be or should be provided, which connection is sealed off with respect to an exiting of gel, in order to permit a measuring of pressure. As a result of such an arrangement in an electrically non-conductive gel, the components of the sensor unit are advantageously protected from an effect of moisture.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
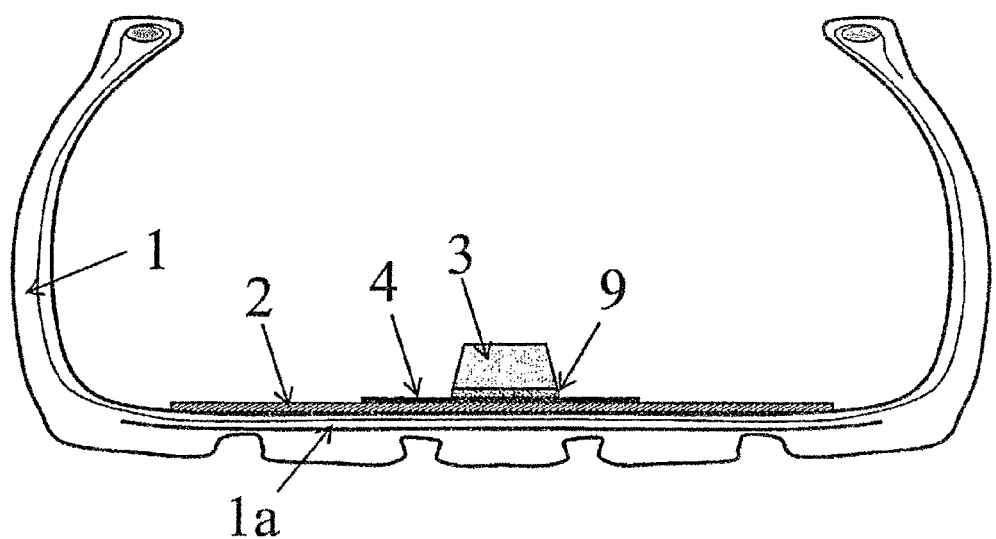
FIG. 1 is a partial cross-sectional view of a vehicle tire according to an embodiment of the invention having a sensor unit and an adhesive film for the latter.

In the figures, identical elements are marked by the same reference numbers. Thus a vehicle tire has the reference number 1. On the interior side of the tire, a sealing material 2 is applied at least to the area of the running surface 1a of the tire 1, which sealing material 2, in the case of damage to the tire running surface 1a in the form of a puncture or of a fairly small tear, closes off the resulting leak at least approximately for a certain period of time. Inside the tire 1, which as customary is pulled by means of its two tire beads onto a wheel rim (not shown), a sensor unit 3 is arranged. The sensor unit 3 preferably determines the pneumatic pressure in the tire 1 and, by way of an antenna not shown in the figures, transmits it telemetrically to an electronic monitoring unit provided in the vehicle body (not illustrated) on which vehicle the tire 1 is mounted.

In this case, the sensor unit 3 consists of a housing or the like, within which the individual electric and/or electronic components and/or sensors of this sensor unit 3 are situated.

Figure 2:
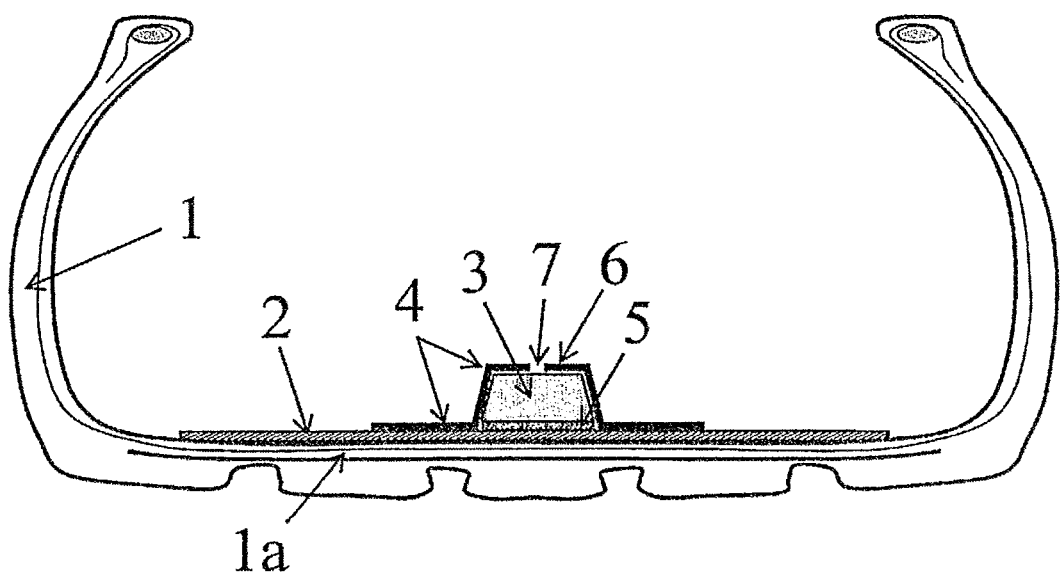
FIG. 2 is a partial cross-sectional view of a vehicle tire according to an embodiment of the invention having a sensor unit and an adhesive film for the latter.

With the use of a so-called adhesive film 4, the sensor unit 3, whose housing has, for example, the shape of a circular truncated cone and which, in FIGS. 1, 2, is shown essentially in a correct scale relative to the tire 1, is fastened in the various embodiments in different manners on the interior side of the tire running surface 1a. The adhesive film 4 is always glued to the interior side of the tire running surface 1a, and specifically onto the sealing material 2 provided there.

For this purpose, an adhesive is used, which is suitable for establishing a glued connection with the sealing material 2, for example, a contact adhesive belonging to the subgroup of physically curing adhesives. The adhesive is ideally selected such that, after being glued together with the sealing material 2, the adhesive film 4 can no longer be pulled off the interior side of the tire without being destroyed. Since the sealing material 2 impairs the adhesive effect on the interior side of the tire, for achieving a sufficient adhesive effect and thus for representing a secure glued connection, the surface of the adhesive film 4 is selected to be significantly larger than the surface of the sensor unit 3 or of a holding device 6 for the sensor unit 3 which faces that interior side of the tire to which the sensor unit 3 is fastened. Concretely, the surface of the adhesive film is therefore several times—by an order of magnitude of at least "10" to "20"—larger than the above-mentioned surface of the sensor unit 3 or of the holding device 6 for the sensor unit 3, because then, by means of a suitable adhesive, for example, a suitable contact adhesive, a sufficiently durable adhesive connection can be achieved between the adhesive film 4 and the tire 1, which holds the sensor unit 3 securely on the interior side of the tire.

In the embodiment according to FIG. 1, the sensor unit 3 is glued with its appropriately designed surface facing the running surface 1a onto adhesive film 4 on its side facing away from the interior side of the tire. In this case, for protecting the sensor unit 3 in the event of a puncturing of the tire in the area of this sensor unit 3, on its side facing the running surface 1a of the tire, a puncture-inhibiting layer 9 or a layer 9 having a sliding capacity with respect to a foreign body puncturing the running surface 1a is provided, as basically known from the initially mentioned German patent document DE 10 2009 006 707 A1. Explicitly, such a layer 9 is provided only optionally.

In the embodiment according to FIG. 2, a holding device 6 for the sensor unit 3 is integrated in the adhesive film 4 itself. Alternatively, the adhesive film 4 is preformed in one area such that, in this area, the adhesive film forms a holding device 6 for the sensor unit 3. As an alternative, such a holding device 6 may be glued onto the adhesive film 4, which, however, would respond more to the diagrammatic representation according to FIG. 1. In contrast, the present FIG. 2 illustrates the principle that the adhesive film 4 covers the sensor unit 3, so that the sensor unit 3 is situated between the adhesive film 4 and the interior side of the tire or the interior side of the tire running surface 1a. In this case, a hole 7 or the like is provided in the adhesive film 5, which hole 7 permits a pressure compensation between the sensor unit 3 and the interior of the tire 1. The sensor unit 3 may, in addition, with its surface, which is designed for this purpose and faces the running surface 1a, be glued onto the interior side of the tire; as an alternative, the holding device 6 worked into the adhesive film 4 can be closed off toward the interior side of the tire, as illustrated here, by means of a closing film 5, so that the adhesive film 4 with the sensor unit and the closing film 5 arranged therein can be supplied as a constructional unit for the insertion into a tire, but this is not absolutely necessary. In contrast, the holding device 6 in the adhesive film 4 may also be designed such that, when the adhesive film 4 is glued onto the interior side of the tire, the sensor unit 3 can be inserted from the center of the tire into the holding device 6. In addition, the above-mentioned (optional) closing film 5 may have a puncture-inhibiting layer or a layer that is slidable with respect to a foreign body puncturing the running surface.

In the embodiment according to FIG. 2, the closing film 5 may preferably be constructed in an electrically conductive manner on its side facing the sensor unit 3 and, in this case, may be designed such that, by means of this closing film 5, in the delivery condition of this constructional unit, a certain electric contact on the sensor unit 3 is closed. When this sensor unit 3 is later removed from the adhesive film 4 glued into the tire, the above-mentioned electric contact is interrupted, whereby a signal is present in the sensor unit 3, as a result of which data stored in the sensor unit 3 and assigned to this tire can be blocked for further use. It therefore becomes possible to basically reuse the sensor unit 3, which is held in the holding device 6 and can be removed from the latter, in another tire, in which case, specific data from the past, i.e. data resulting from the use in previous ties and stored in the sensor unit 3 cannot be accessed, as basically described in German patent document DE 10 2007 060 861. Naturally, the same effect can also be achieved by way of an electrically conductive section of the adhesive film 4 provided in the area of the holding device 6.

Figure 3:
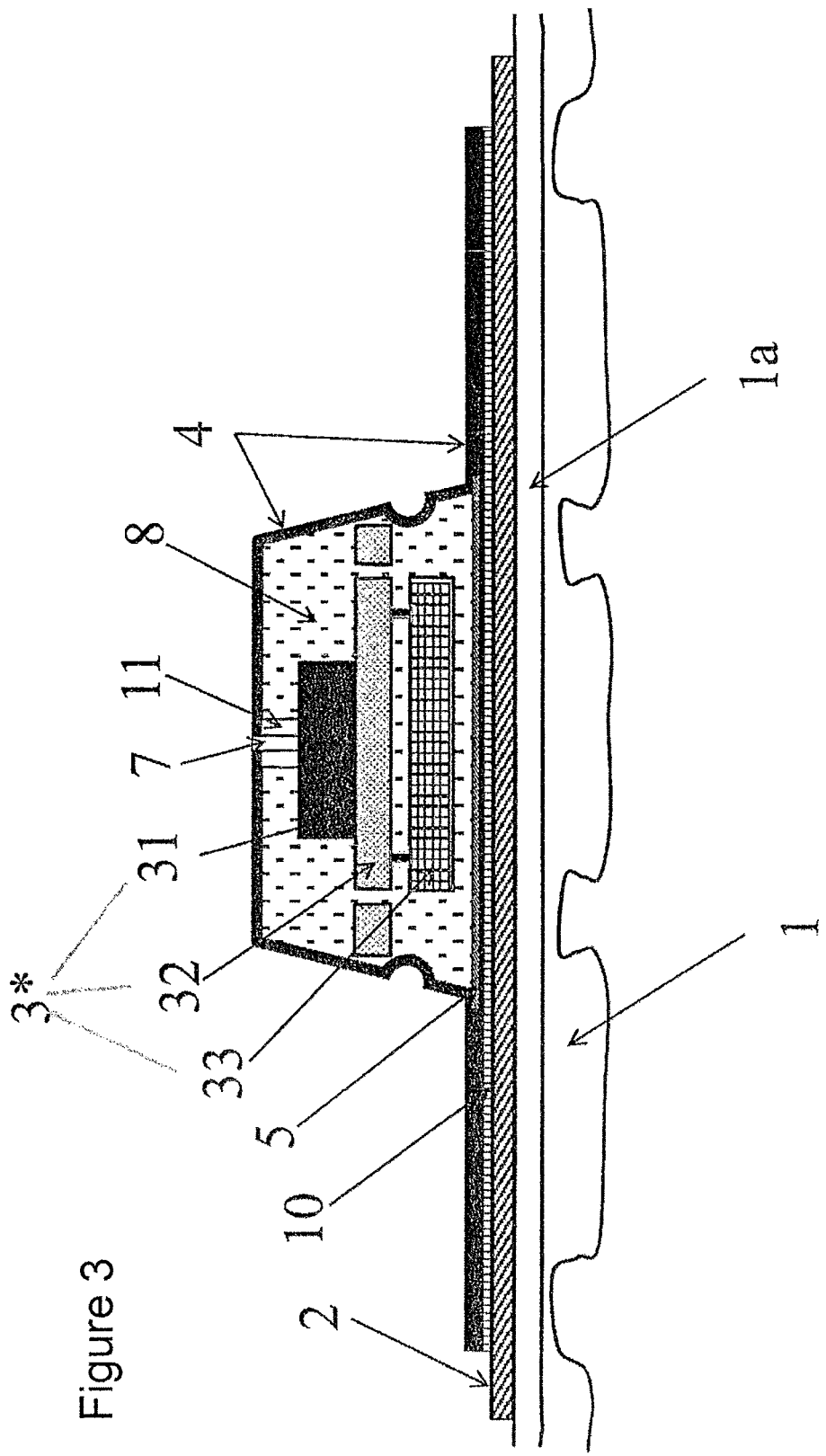
FIG. 3 is a corresponding sectional view essentially only of the tire running surface with the adhesive film glued thereon and the gel enclosed therein for a floating arrangement of the sensor unit.

In the embodiment according to FIG. 3, the sensor unit, here characterized in its totality by reference number 3*, in contrast to the preceding embodiments, has no rigid housing, in which the above-mentioned electric/electronic elements are provided, but in this case, these individual electric/electronic elements are disposed as the sensor unit 3* without a surrounding housing in an electrically non-conductive gel 8 in a quasi-floating manner. The adhesive film 4 therefore represents a quasi-housing of the sensor unit 3*, which, among other things permits a weight reduction. Specifically, the individual elements of the sensor unit 3* are an integrated switching circuit 31 which contains a pressure sensor and possibly an acceleration sensor, which integrated switching circuit 31 is disposed on a printed circuit board 32 that is supplied with electric energy by a battery 33 or the like.

As illustrated, the gel 8 is held in a "bulge" or the like of the adhesive film 4, which extends away from the interior side of the tire running surface 1a. This bulge portion accommodating the gel 8 is reasonably closed off or sealed off all-around, for which, in the present case, a closing film is provided. The closing film, in the mounted condition of the adhesive film on the interior side of the tire, rests against the interior side of the tire running surface 1a or, like the adhesive film 4, is glued to the interior side of the tire away from its bulge, by way of a layer 10 of adhesive illustrated in this FIG. 3, i.e. onto the sealing material 2 explained in connection with FIGS. 1, 2. Furthermore, in the present schematic diagram (FIG. 3), a ring-shaped sealing element 11 is arranged between the surface of the switching circuit 31 and the interior side of the adhesive film 4 at a hole 7 in the adhesive film 4, by way of which hole 7 the pressure sensor in the switching circuit 31 is exposed to the pneumatic pressure in the tire interior, which ring-shaped sealing element 11 prevents the exiting of gel 8 through this hole 7.

Advantageously, the adhesive film 4 of the embodiment according to FIG. 3, together with the sensor unit 3*, i.e. together with the components that were described and marked with the reference numbers 7-11, forms a cohesive prefabricated module, which can be glued into the tire 1 after the protective film was pulled off, for example, in a vehicle manufacturer's plant or in a tire merchant's shop. As a result of the further development into an oblong shape, specifically in that the length of the adhesive film 4 measured in the circumferential direction of the tire 1 is greater than the width of the tire 1, the sensor unit 3* can advantageously be introduced into the tire only in an alignment favorable for the function and the service life of the pressure sensor 31 (and the normally integrated acceleration sensor).

Advantageously, in the case of the arrangement of the individual elements of the sensor unit 3* in the gel 3 illustrated in FIG. 3, the battery 33 (or a device for generating electric energy provided instead of the battery 33) may take over the function of a puncture-inhibiting layer provided in the two other embodiments. In addition,—which is not separately indicated in the figures—, the adhesive film 4 itself may be provided at least in the area of the sensor unit 3 with a material that is resistant to a tire puncture and/or is slidable for a puncturing foreign body, or may consist of such a material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle pneumatic tire, comprising:
   a sealing material on an interior side of the tire, which sealing material, when the tire is damaged, at least approximately closes off a resulting leak; and a sensor unit provided in a section of the tire equipped with sealing material, wherein:
the sensor unit monitors pneumatic pressure in the tire,
the sensor unit is fastened via an adhesive film on the interior side of the tire equipped with the sealing material, the adhesive film being adhered over a large surface area onto the interior side of the tire,
the large surface area of the adhesive film is several times larger than a base surface of the sensor unit or of a holding device for the sensor unit, which base surface faces the interior side of the tire.

2. The vehicle pneumatic tire according claim 1, wherein the adhesive film covers the sensor unit so that the sensor unit is situated between the adhesive film and the interior side of the tire.

3. The vehicle pneumatic tire according to claim 2, wherein the sensor unit is at least one of: (i) glued onto the adhesive film, and (ii) held in a holding device provided at the adhesive film or formed into the latter.

4. The vehicle pneumatic tire according to claim 1, wherein the sensor unit is at least one of: (i) glued onto the adhesive film, and (ii) held in a holding device provided at the adhesive film or formed into the latter.

5. The vehicle pneumatic tire according to claim 1, wherein the large surface area of the adhesive film is larger by an order of magnitude of at least 10 to 20 than the base surface of the sensor unit facing the interior side of the tire of the holding device for the sensor unit.

6. The vehicle pneumatic tire according to claim 5, wherein a length of the adhesive film measured in a circumferential direction of the tire is greater than a width of the tire.

7. The vehicle pneumatic tire according to claim 5, wherein, in addition to the sensor unit, an additional unit for monitoring the tire or a unit obtaining data or electric energy from movement of the tire, is provided on the adhesive film or is held on the interior side of the tire by the adhesive film.

8. The vehicle pneumatic tire according to claim 7, wherein an electric connection between the sensor unit or an electric terminal area provided for the sensor unit and the additional unit or another electric terminal area is provided in or on the adhesive film or on a closing film interacting with the adhesive film in an area of the sensor unit and resting against the sensor unit.

9. The vehicle pneumatic tire according to claim 1, wherein a length of the adhesive film measured in a circumferential direction of the tire is greater than a width of the tire.

10. The vehicle pneumatic tire according to claim 6, wherein, in addition to the sensor unit, an additional unit for monitoring the tire or a unit obtaining data or electric energy from movement of the tire, is provided on the adhesive film or is held on the interior side of the tire by the adhesive film.

11. The vehicle pneumatic tire according to claim 10, wherein an electric connection between the sensor unit or an electric terminal area provided for the sensor unit and the additional unit or another electric terminal area is provided in or on the adhesive film or on a closing film interacting with the adhesive film in an area of the sensor unit and resting against the sensor unit.

12. The vehicle pneumatic tire according to claim 1, wherein, in addition to the sensor unit, an additional unit for monitoring the tire or a unit obtaining data or electric energy from movement of the tire, is provided on the adhesive film or is held on the interior side of the tire by the adhesive film.

13. The vehicle pneumatic tire according to claim 12, wherein an electric connection between the sensor unit or an electric terminal area provided for the sensor unit and the additional unit or another electric terminal area is provided in or on the adhesive film or on a closing film interacting with the adhesive film in an area of the sensor unit and resting against the sensor unit.

14. The vehicle pneumatic tire according to claim 1, wherein the adhesive film is designed to accommodate the sensor unit quasi-floatingly disposed in a gel or in a gel-type material.

15. The vehicle pneumatic tire according to claim 1, wherein the adhesive film has an essentially diffusion-tight barrier layer.

16. The vehicle pneumatic tire according to claim 1, wherein the adhesive film is equipped at least in the area of the sensor unit with a material resistant to a puncturing of the tire.

17. The vehicle pneumatic tire according to claim 1, wherein the adhesive film is equipped at least in the area of the sensor unit with a material that is slidable for a puncturing foreign body.

18. The vehicle pneumatic tire according to claim 1, wherein the adhesive film comprises a puncture resistant material.

19. The vehicle pneumatic tire according to claim 1, wherein the adhesive film comprises a material slidable for a puncturing foreign body.

* * * * *